UNITED STATES PATENT OFFICE.

JOKICHI TAKAMINE, OF TOKIO, JAPAN.

PROCESS OF THE MANUFACTURE OF ALCOHOLIC LIQUIDS.

SPECIFICATION forming part of Letters Patent No. 411,231, dated September 17, 1889.

Application filed May 29, 1889. Serial No. 312,598. (No specimens.) Patented in England May 19, 1887, No. 7,277; in France February 27, 1888, No. 188,996, and in Belgium February 28, 1888, No. 80,796.

*To all whom it may concern:*

Be it known that I, JOKICHI TAKAMINE, chemist, a subject of the Emperor of Japan, residing at the Government Department of Agriculture and Commerce, Tokio, Japan, have invented certain new and useful Improvements in the Process of the Manufacture of Alcoholic Liquids, (for which I have received Letters Patent in Great Britain, No. 7,277, dated May 19, 1887; in France, No. 188,996, dated February 27, 1888, and in Belgium, No. 80,796, dated February 28, 1888,) of which the following is a specification.

The object of this invention is to ferment alcoholic liquor of greater percentage of alcohol than hitherto done and of any desired strength under eighteen per cent. of alcohol. Liquors fermented by European vinous yeast produce no more than five or six per cent. of alcohol for every hundred parts of the fermentable liquor. Therefore—say in the manufacture of whisky—in order to obtain six parts of alcohol one hundred parts of liquor have to be dealt with all through the process.

By my new process I produce by direct fermentation a liquor containing fifteen to eighteen per cent. of alcohol or containing any desired strength under eighteen per cent. of alcohol. Thus in order to get the same quantity of alcohol as before I have to deal only with a third part of the liquor. Thus the cost of labor and fuel, the amount of capital, the size of the manufacturing plant are reduced to one-third or thereabout; or a given-sized works can produce three times as much alcohol as by the old process with the same, or nearly the same, working expenses.

To carry out this invention, the liquor to be fermented—say wort—is made three times stronger, or of a strength corresponding to the desired strength of alcohol to be produced. To this an active ferment contained in "koji" is added, or, preferably, a mixture of moto and koji, or a mixture of ordinary yeast with moto, or the mixture of moto and koji. Moto and koji may be mixed in the proportions of one part of the former to two or three parts of the latter. When yeast is used, it may be to the extent of one-half, one-third, one-fourth, &c., of the whole. The fermentation is carried on with the usual precautions.

The resulting fermented liquor, when a wash of suitable strength is fermented with koji or a mixture of moto and koji, contains fifteen to eighteen per cent. of alcohol, by weight.

The apparatus used in this new process does not differ materially from the old process.

Moto and koji are both prepared from moyasi. Moyasi is a yellowish powder consisting of the spores of a fungus, variously described under the names of eurotinus, oryzeae, eurotinus aspirgillus, and mucor racernosus.

The substance koji is metamorphized moyasi fungus. The change is effected in a dry way by the agency of oxygen, carbon dioxide, and humidity. The preparation of koji is well known in Japan, and it is one of the commercial products of the country.

Moto is obtained by the addition of koji to gelatinized starch in the ratio of forty per cent. koji to sixty per cent. starch, and an equal volume of water. The moto is well known in its mode of preparation in every brewery in the country.

I claim—

1. The process of making alcoholic liquors, which consists in fermenting a suitable solution or wash with the aid of moyasi fungus and distilling the product, as herein set forth.

2. The process of making alcoholic liquors, which consists in fermenting a suitable solution or wash with a mixture of moto and koji and distilling the product, as herein set forth.

JOKICHI TAKAMINE.

Witnesses:
G. H. SCIDMORE,
JOHN MCLEAN.